United States Patent [19]

Noonan

[11] Patent Number: 4,956,991

[45] Date of Patent: Sep. 18, 1990

[54] VARIABLE DEPTH COLD WORKING TOOL

[75] Inventor: Denis E. Noonan, Hicksville, N.Y.

[73] Assignee: Grumman Aerospace Corporation, Bethpage, N.Y.

[21] Appl. No.: 445,570

[22] Filed: Dec. 1, 1989

[51] Int. Cl.$^5$ .................. B21J 13/02; B23P 11/02
[52] U.S. Cl. ............................. 72/370; 72/36; 29/446
[58] Field of Search ............ 72/31, 32, 35, 36, 370, 72/391; 29/446, 523

[56] References Cited

U.S. PATENT DOCUMENTS

| | | | |
|---|---|---|---|
| 3,385,087 | 5/1968 | Huth | 72/36 |
| 4,140,000 | 2/1979 | Ehmann | 72/35 |
| 4,423,619 | 1/1984 | Champoux | 72/370 |
| 4,557,033 | 12/1985 | Champoux | 72/370 |
| 4,574,612 | 3/1986 | Tanikawa | 72/35 |
| 4,640,111 | 2/1987 | Kuless | 72/370 |

Primary Examiner—Lowell A. Larson
Attorney, Agent, or Firm—Pollock, Vande Sande & Priddy

[57] ABSTRACT

A portion of a hole drilled through various layers of structural material may be cold worked by forcing a mandrel through a sleeve lining the hole. In order to precisely fix the projection of the sleeve within the hole of one layer, the thickness is first determined by ultrasonic measurement. Then, a micrometer assembly is employed to project the sleeve outwardly from a tool nose piece by the dimension prceisely equal to the ultrasonically measured thickness. The present tool enables cold working of a hole within only one layer of material while avoiding disturbance of the hole continuation in other layers.

5 Claims, 2 Drawing Sheets

VARIABLE DEPTH COLD WORKING TOOL

FIELD OF THE INVENTION

The present invention relates to metal cold working tools, and more particularly to a tool capable of cold working a variable depth of a hole.

BACKGROUND OF THE INVENTION

In the aircraft industry it occasionally becomes necessary to cold work a fastener hole when the fastener is replaced, in order to avoid premature fatigue. For example, aircraft wing skin is secured to internal wing beams by means of fasteners. During the useful life of the aircraft, it may be necessary to replace some of the fasteners. In such an event it is sometimes advisable to cold work the hole in order to increase fatigue life of the skin.

When cold working the hole, it is advantageous to merely cold work the hole of the skin and not a continuation of the aligned hole which exists in a corresponding support beam.

In order to cold work a hole, a sleeve is frequently inserted therein and a mandrel is forced through the sleeve so that the outward expansion of the sleeve cold works the hole in which the sleeve rests. However, with aircraft skin the exact thickness varies so that a standard length sleeve may not be used.

Up to now it has been a laborious process to measure the depth of the aircraft skin at a particular hole to be cold worked and then adjust the cold working tool to cold work only the hole within the aircraft skin and not the extended hole within the beam. Prior art attempts have fallen short in this respect and have resulted in either incompletely cold worked skin holes or overextending cold working, which adversely affects the structural integrity of fastener holes within the beams.

BRIEF DESCRIPTION OF THE INVENTION

The present invention offers a method and apparatus for quickly gauging the variable depth of a hole in an aircraft skin and then cold working that hole up to an interface with a support beam.

This is accomplished by ultrasonically measuring the depth to be cold worked and then quickly adjusting a tool nose piece with a micrometer so that a mandrel sleeve is precisely positioned outwardly from the nose piece so that the sleeve maintains the exact desired depth within the hole for mandrel cold working.

By virtue of the present invention, one may be assured that the hole to be cold worked is precisely through the thickness of an aircraft wing skin without intruding into that portion of the aligned hole existing within the support beam. Thus, fatigue life characteristics may be maximized prior to the insertion of a new fastener within a through hole in the aircraft skin and supporting beam.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
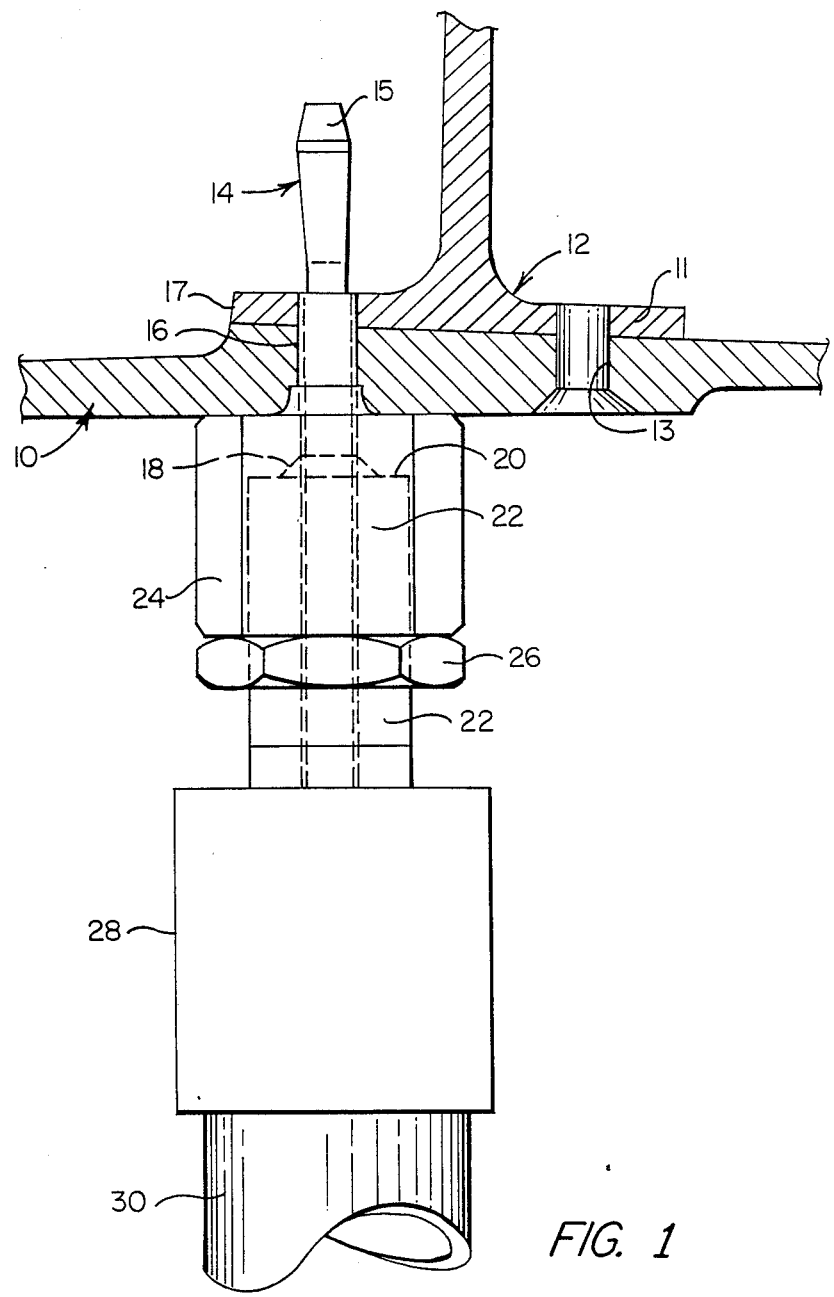
FIG. 1 is an elevational view of the present cold working tool shown in an operative position for cold working a hole, extending through an aircraft skin and supporting beam.

Reference numeral 10 generally indicates an aircraft skin which is fastened to a supporting beam 12 by fasteners. The fasteners are shown removed in FIG. 1 so that the holes 13 passing through the skin 10 and beam web 11 may be cold worked.

A mandrel generally indicated by reference numeral 14 is shown positioned through the aligned holes in the aircraft skin 10 and web 11. The mandrel is formed with an enlarged end 15 which will actually perform the cold working as presently described. A sleeve 16 is slipped over the length of the mandrel and likewise rests within the hole formed in aircraft skin 10. However, it is critical that the upper illustrated end of the sleeve does not extend beyond the interface 17 existing between the interior surface of the aircraft skin 10 and the beam web 11. The apparatus for ensuring the precise protrusion of sleeve 16 to achieve this degree of insertion will be explained in connection with FIG. 2.

The opposite or downward illustrated end of sleeve 16 is outwardly flared, as indicated at reference numeral 18 so that it may come to rest against confronting surface 20 of an outwardly threaded sleeve stop 22. An adjusting member 24 in the form of a jaw is positioned against the exterior surface of aircraft skin 10 while mandrel 14 and overlying sleeve 16 are located within a through hole formed through the skin and beam web. A lock nut 26 fastens the adjuster member 24 so that it cannot move axially downwardly as the illustrated tool is pressed against the exterior surface of the aircraft skin 10. A nose cap 28 of the illustrated tool provides a means for attaching a conventional mandrel puller 30. Such pullers are quite conventional in the cold metal working arts. As the puller 30 is retracted downwardly, as illustrated, the mandrel 14 moves through the sleeve 16 and causes its expansion to the outer diameter of the enlarged end 15. This force exerted by the sleeve against the wall of the hole within the aircraft skin 10 is what accomplishes cold working of the hole. After the mandrel passes through the entire thickness of the aircraft skin, the sleeve may be removed.

Figure 2:
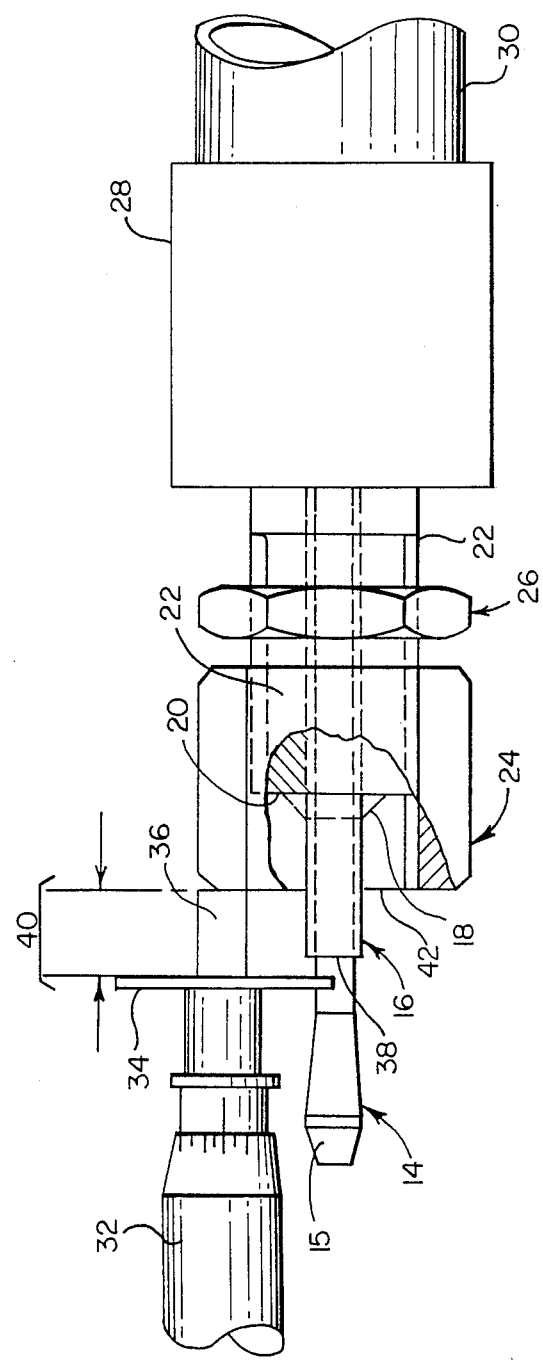
FIG. 2 is a partial cut-away elevational view of the present invention cooperating with a micrometer for adjusting sleeve protrusion.

FIG. 2 illustrates the present invention during a sleeve protrusion adjustment necessary to ensure precise inward protrusion of sleeve 16 to the interface 17 (FIG. 1). A micrometer 32 has a "V" slotted plate 34 straddling the micrometer anvil 36 and the main length of mandrel 14. The anvil 36 is extended to equal the ultrasonically measured thickness of a particular hole in the aircraft skin (which may vary from point to point). The adjuster member 24 is placed on the anvil end so that contact therewith is achieved. Then, the adjuster member 24 is threaded away from plate 34 until the left illustrated end 38 of sleeve 16 contacts the plate 34. At this point the protrusion of the sleeve 16, from the adjuster member 24, is precisely equal to the thickness of the aircraft skin where a hole is to be cold worked. Lock nut 26 is screwed down against the adjuster member 24 to prevent displacement of the sleeve. After the micrometer 32 and plate 34 are removed from the tool, the tool may be operated in accordance with the previous discussion made in connection with FIG. 1.

Thus, according to the preceding description of the invention, it will be appreciated that a cold working tool and procedure is defined for enabling the rapid cold working of variable depth holes within an aircraft skin while ensuring that the structural web to which the aircraft skin is secured is not disturbed. This will maximize the fatigue life of the fastener hole when a fastener is re-inserted therein.

All of the preceding discussion concentrates upon a preferred embodiment of use, namely the cold working of fastener holes within aircraft skins, it should be appreciated that the invention and following claims apply equally well to other types of panel members secured to structural beams or frame members.

It should be understood that the invention is not limited to the exact details of construction shown and described herein for obvious modifications will occur to persons skilled in the art.

I claim:

1. A tool for cold-working a precise predetermined depth of a hole in a structure, the tool comprising:
   a mandrel;
   a sleeve movably mounted on the mandrel and having a flared end;
   a first hollowed cylindrical member for supporting the sleeve, the member having a transverse end abutting the flared end of the sleeve while the opposite sleeve end extends outwardly from the tool;
   a second hollowed cylindrical member threaded onto the first member and adjustably positioned to expose a length of sleeve equal to the predetermined length of the hole to be cold worked;
   wherein an outward transverse end of the second hollowed cylindrical member is positioned against the structure to ensure protrusion of the sleeve to the predetermined depth.

2. The structure set forth in claim 1 together with means connected to the mandrel for pulling it through an installed sleeve for expanding the sleeve within the hole thereby cold working the hole.

3. The structure set forth in claim 1 together with a micrometer anvil positioned against the outward transverse end of the second hollowed cylinder member;
   a plate having a V-shaped notch formed therein for permitting the plate to straddle the anvil and the mandrel, the distance between the outward anvil end and the plate being adjusted to precisely equal the preselected hole depth, the first cylindrical member being adjustable to move the protruding end of the sleeve into contact with the plate thus correspondingly protruding the sleeve beyond the outward transverse end of the second cylindrical member by a distance equal to the predetermined depth.

4. The structure set forth in claim 3 together with a lock nut for securing the first and second cylindrical members in adjusted positions.

5. A method for cold working a preselected depth of a hole comprising the steps:
   extending a micrometer anvil to a measured distance beyond a reference plane equal to the hole depth to be cold worked;
   inserting a mandrel into puller tool;
   sliding a sleeve over the mandrel;
   fixing the protrusion of the sleeve beyond the tool to equal the measured distance;
   inserting the sleeve bearing mandrel into the hole so that the sleeve extends to the preselected depth;
   pulling the mandrel outwardly thereby causing expansion of the sleeve to cold work the hole; and
   removing the sleeve.

* * * * *